United States Patent
Chavez et al.

(10) Patent No.: US 6,694,221 B2
(45) Date of Patent: Feb. 17, 2004

(54) CONTROLLED INVENTORY DEVICE AND METHOD USING PRESSURE TRANSDUCER

(75) Inventors: Jeffrey Arrey Chavez, Ladera Ranch, CA (US); Anton Cornelius Visser, Coto de Caza, CA (US); Peter Phillip Godlewski, Rancho Santa Margarita, CA (US)

(73) Assignee: Dispensesource, Inc., Rancho Santa Margarita, CA (US)

( * ) Notice: Subject to any disclaimer, the term of this patent is extended or adjusted under 35 U.S.C. 154(b) by 157 days.

(21) Appl. No.: 10/008,612

(22) Filed: Oct. 23, 2001

(65) Prior Publication Data

US 2003/0078693 A1 Apr. 24, 2003

(51) Int. Cl.[7] ............................................. G06F 17/00
(52) U.S. Cl. .................... 700/236; 700/237; 700/244
(58) Field of Search ............................... 700/231, 232, 700/236, 237, 241, 244; 705/28; 235/385

(56) References Cited

U.S. PATENT DOCUMENTS

| | | | | |
|---|---|---|---|---|
| 3,716,697 A | * | 2/1973 | Weir | 235/383 |
| 4,108,363 A | * | 8/1978 | Susumu | 235/383 |
| 4,836,352 A | * | 6/1989 | Tateno et al. | 194/215 |
| 4,866,661 A | * | 9/1989 | de Prins | 235/382 |
| 5,520,450 A | * | 5/1996 | Colson et al. | 312/215 |
| 5,716,114 A | | 2/1998 | Holmes et al. | |
| 5,728,999 A | * | 3/1998 | Teicher | 235/381 |
| 5,745,366 A | | 4/1998 | Higham et al. | |
| 5,805,455 A | | 9/1998 | Lipps | |
| 5,905,653 A | * | 5/1999 | Higham et al. | 700/244 |
| 5,927,540 A | | 7/1999 | Godlewski | |
| 6,131,622 A | | 10/2000 | Fritze et al. | |
| 6,204,763 B1 | * | 3/2001 | Sone | 340/568.1 |
| 6,341,271 B1 | | 1/2002 | Salvo et al. | |
| 6,418,416 B1 | | 7/2002 | Rosenberg et al. | |
| 6,539,281 B2 | * | 3/2003 | Wan et al. | 700/236 |

FOREIGN PATENT DOCUMENTS

| | | |
|---|---|---|
| EP | 0 733 985 A2 | 9/1996 |
| WO | WO 00/29925 | 5/2000 |

* cited by examiner

Primary Examiner—Khoi H. Tran
(74) Attorney, Agent, or Firm—Knobbe Martens Olson & Bear LLP

(57) ABSTRACT

A method and apparatus for controlled dispensing of consumable supply items, such as office supplies, wherein the quantity of items added or removed from the apparatus is determined by sensing a change in weight of items within the apparatus. The apparatus may be in the form of a cabinet having a plurality of doors, each door having a secured position preventing access to the items within the cabinet. The cabinet may be configured to unlock less than all of the doors to allow limited access to the items based on various factors, such as user identification and item cost.

10 Claims, 9 Drawing Sheets

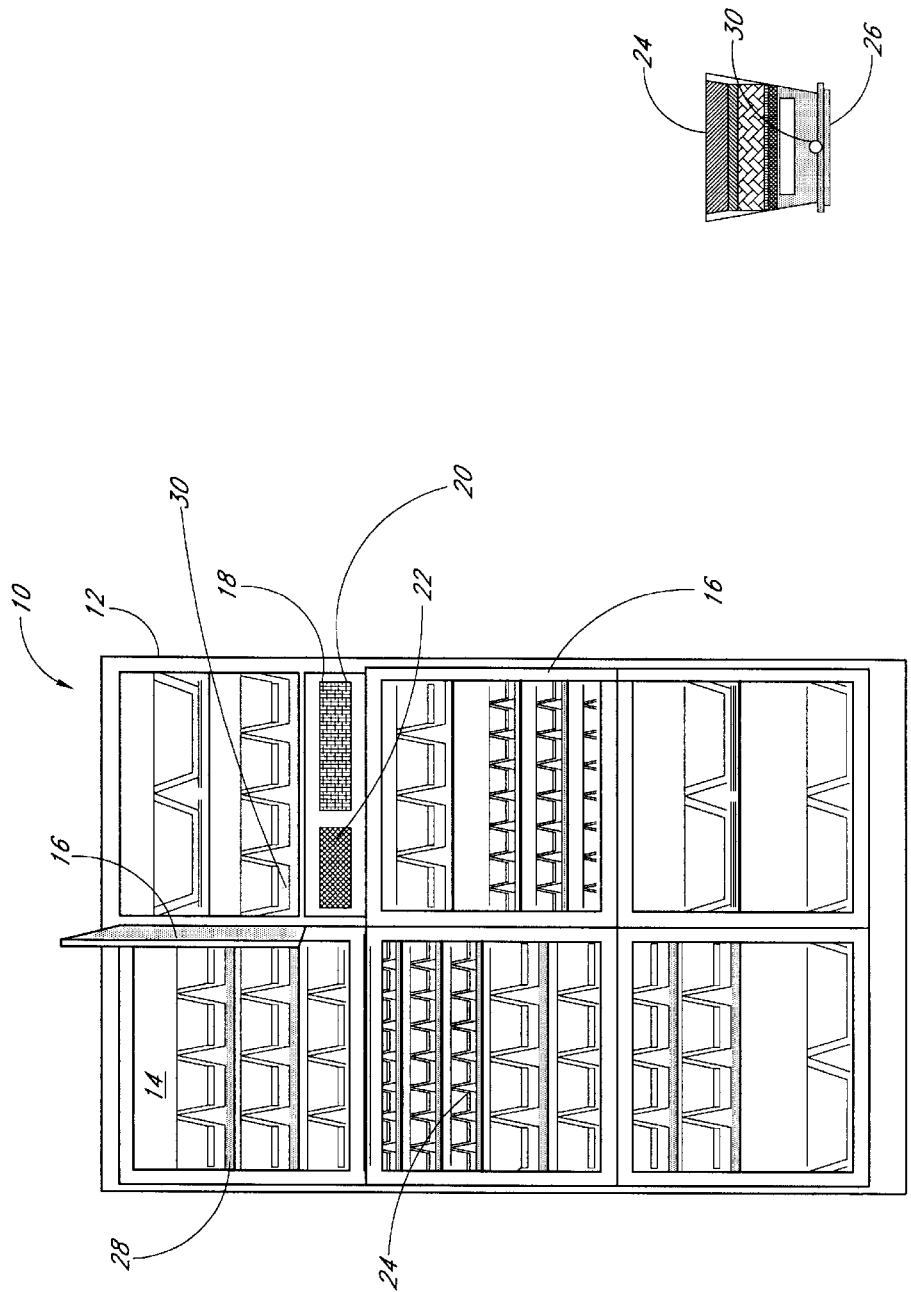

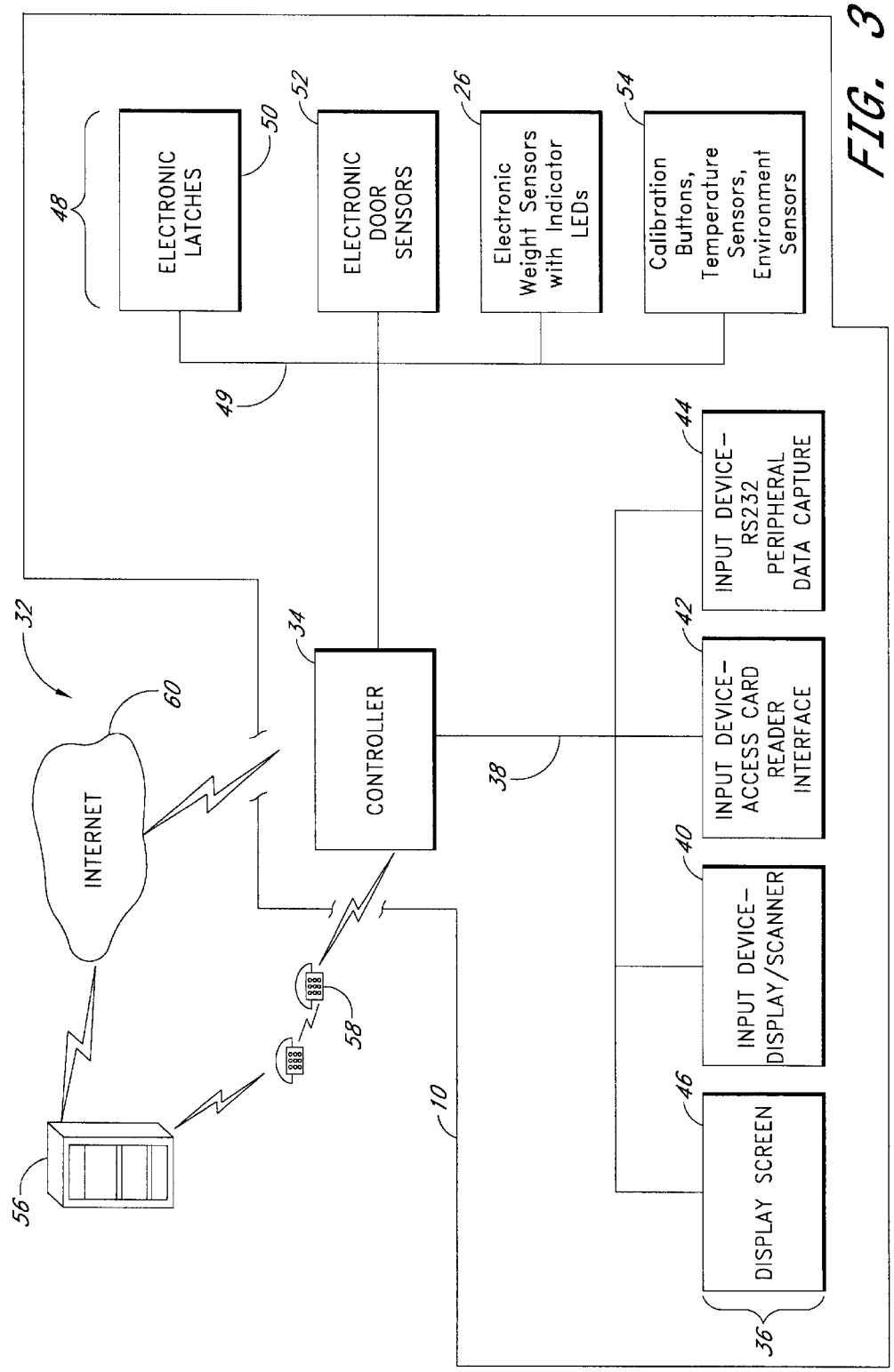

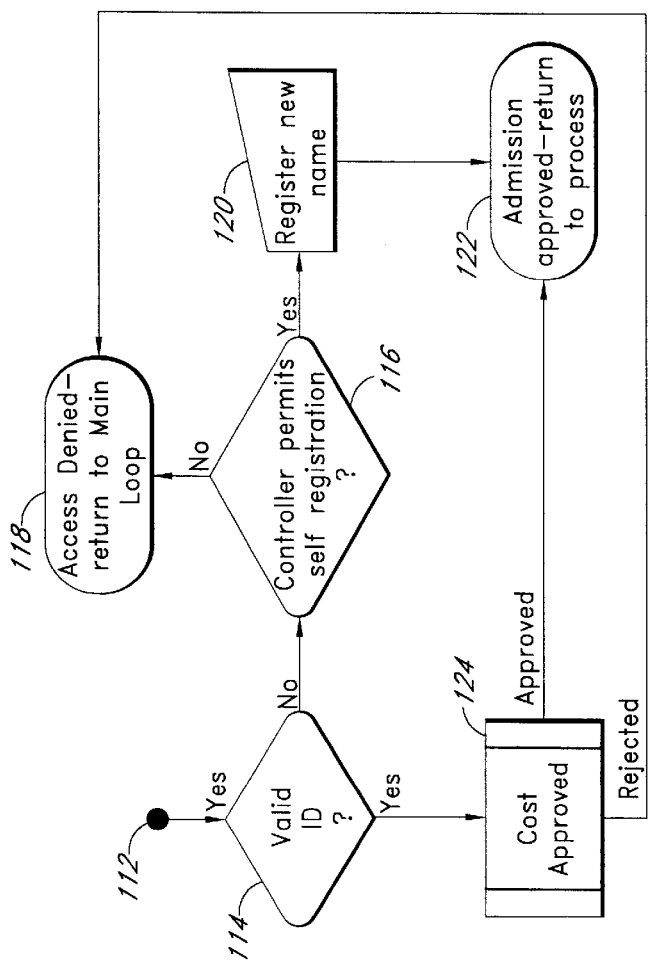
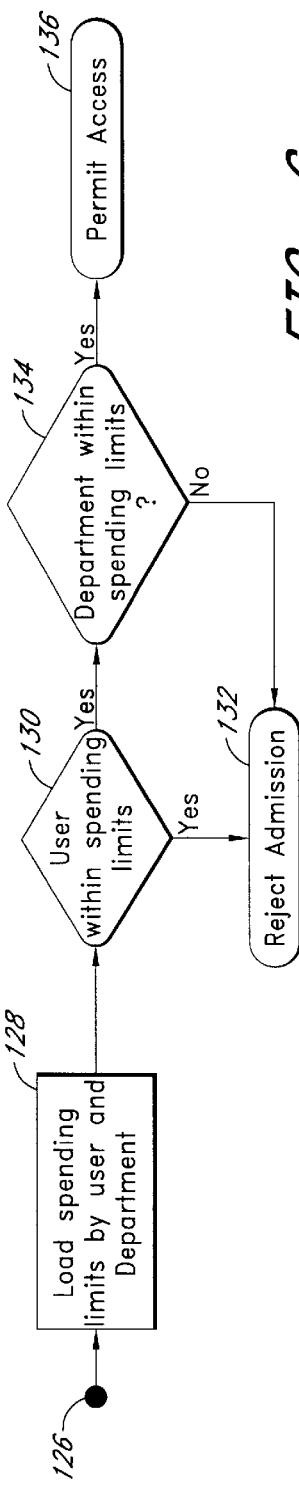
FIG. 5
FIG. 6

CONTROLLED INVENTORY DEVICE AND METHOD USING PRESSURE TRANSDUCER

BACKGROUND OF THE INVENTION

1. Field of the Invention

The present invention relates to inventory management systems for consumable supply items. More specifically, the present invention relates to a method and apparatus for providing controlled access to supply items and automatically determining changes in inventory levels.

2. Description of the Related Art

Various systems are known for providing controlled dispensing and inventory management for a variety of items. For example, in the medical field, systems are known for providing controlled access and inventory management for pharmaceutical supplies. Similarly, there are known systems for accurately managing inventory levels for raw materials and work-in-process materials in a manufacturing environment. However, in each of these instances, the inventory items are characterized by a relatively high per-item cost. Therefore, it is economically feasible to employ complex systems to accurately manage inventory levels and/or control dispensing of the items.

In contrast, the inventory of supply items characterized by a low per-item cost is typically managed by physical inspection of the quantity of items present. Although these types of supply items, such as office supplies or industrial supplies, are utilized by a large variety of businesses, the use of known controlled inventory systems is not economically justified in these low per-item cost applications. As is known, inventory control by physical inspection may be unreliable and often results in depletion of certain supply items before a restocking order is generated.

SUMMARY OF THE INVENTION

The preferred embodiments of the present invention provide an economically-feasible system for use with relatively low per-item cost supplies, such as office supplies or industrial supplies, which accurately manages inventory levels to ensure a sufficient level of supply items are available. These systems are especially advantageous for providing controlled access to such low per-item cost supplies.

One aspect of a preferred controlled inventory system is an office supply dispensing apparatus including a cabinet defining an enclosed space and having at least one door. The at least one door has a secured position wherein access to the enclosed space is prevented. The cabinet includes at least one surface within the enclosed space, wherein the at least one surface is configured to receive a quantity of an office supply item. The dispensing apparatus includes a controlled inventory arrangement comprising a memory for storing a programmable protocol, a processor for processing the programmable protocol, and a user interface electrically connected to the processor. The user interface is configured to receive a user identification input. The controlled inventory arrangement also includes a weight sensor electrically connected to the processor, wherein the weight sensor is operatively associated with the at least one surface to determine the weight of the quantity of office supply items. The controlled inventory system is configured to release the at least one door from the secured position in response to processing of the programmable protocol upon receiving an approved user identification input. The controlled inventory arrangement is additionally configured to determine a change in the quantity of office supply items in response to processing of the programmable protocol upon determining a change in weight of the quantity of office supply items.

A further aspect of a preferred controlled inventory system is a perishable item dispensing apparatus including a refrigerated cabinet defining an enclosed space and having at least one door. The at least one door has a secured position wherein access to the enclosed space is prevented. The cabinet includes at least one surface within the enclosed space, wherein the at least one surface is configured to receive a quantity of a perishable item. The dispensing apparatus includes a controlled inventory arrangement comprising a memory for storing a programmable protocol, a processor for processing the programmable protocol, and a user interface electrically connected to the processor. The user interface is configured to receive a user identification input. The controlled inventory arrangement also includes a weight sensor electrically connected to the processor, wherein the weight sensor is operatively associated with the at least one surface to determine the weight of the quantity of perishable items. The controlled inventory system is configured to release the at least one door from the secured position in response to processing of the programmable protocol upon receiving an approved user identification input if the current date is before the expiration date of the desired perishable item. The controlled inventory arrangement is additionally configured to determine a change in the quantity of perishable items in response to processing of the programmable protocol upon determining a change in weight of the quantity of perishable items.

Another aspect of the controlled inventory system includes a method of controlled dispensing of office supplies. The method includes providing a secured selection of office supply items, wherein each of the office supply items has a known weight. The method also includes authenticating the identification of a user of the office supply items and asking the user to select a transaction account. The method further includes allowing the user to access a portion of the selection of the office supply items according to predetermined user access rights. The method determines a quantity of the office supply items added or removed by the user by determining a change in weight of the office supply items. Further, the method records the addition or removal of the supply items to the transaction account.

A further aspect of the controlled inventory system includes a method of controlled dispensing of consumable supplies. The method includes the step of providing a secured selection of consumable supply items, each of the items having a known weight. The method further includes the step of providing a plurality of bins for storing the items, each bin having an associated weight sensor for determining the weight of the items within the bin. The method additionally includes authenticating the identification of a user of the items and requesting the user to select a transaction account. The method allows the user to access a portion of the bins according to predetermined user access rights. The method also includes the steps of determining a quantity of the items added or removed from one of the plurality of bins by the user by determining a change in a weight of the bin and recording the addition or removal of the items to the transaction account.

BRIEF DESCRIPTION OF THE DRAWINGS

These and other features, aspects and advantages of the method and apparatus will now be described with reference to the drawings of a preferred embodiment, which is intended to illustrate and not to limit the invention. The drawings comprise nine figures.

FIG. 1 is a schematic illustration of the front side of a preferred dispensing cabinet, which encloses a plurality of bins for holding supply items. Each bin is mounted on an associated weight sensor;

FIG. 2 is an enlarged bin and weight sensor of FIG. 1. The weight sensor includes an indicator light;

FIG. 3 is a schematic illustration of the electronic layout of the preferred apparatus of FIG. 1, including a communications link to a remote data server;

FIG. 5 is an operational flow diagram for an optional self-registration routine for the preferred method of FIG. 4;

FIG. 6 is an operational flow diagram for a method of restricting access to supply items based on user or department spending limits;

DETAILED DESCRIPTION OF THE PREFERRED EMBODIMENT

Figure 4:
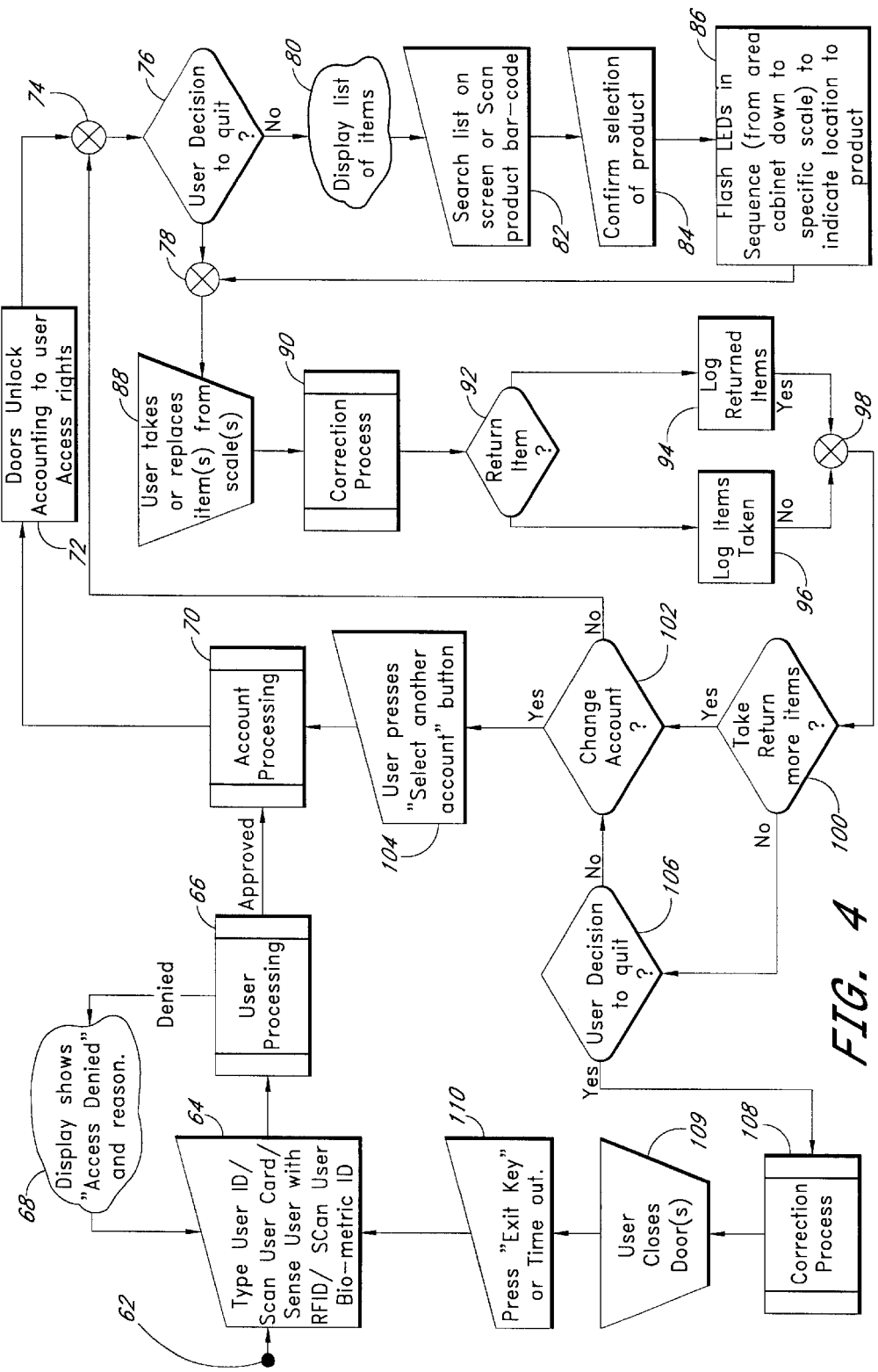
FIG. 4 is an operational flow diagram for a preferred method of controlled dispensing of supply items.

FIG. 1 illustrates a preferred embodiment of a dispensing apparatus 10 suitable for providing controlled dispensing of supply items, such as office supplies or industrial supplies. The apparatus 10 of FIG. 1 is embodied in a cabinet 12, which defines an enclosed space 14 for at least partially enclosing a plurality of supply items. Preferably, the cabinet 12 is made from a suitable material, such as steel, in accordance with conventional fabrication techniques. However, alternative materials, such as alloys and plastic, may also be used.

An open front side of the cabinet 12, illustrated in FIG. 1, is desirably closed by a plurality of doors 16. The open portion of the cabinet 12 may encompass the entire front side or a portion thereof. The doors 16 may be configurable in size and number to suit a desired application. FIG. 1, however, illustrates two columns and three rows of doors 16, for a total of six doors.

Each of the doors 16 may be closed and locked into a secured position by a suitable electronically-operated lock assembly (not shown). When in the secured position, the doors 16 prevent access to the supply items within the enclosed space 14. The electronic lock assemblies which hold the doors in the secured position are desirably controlled by a controller 34 (FIG. 3), which will be described in detail below.

The dispenser 10 also desirably includes a user interface 18 which allows communication between the controlled inventory system and a user. The user interface 18 preferably includes at least an input device 20, such as a keyboard, and an output device 22, such as a display screen. The input device 20 allows a user to input information to the controlled inventory system. The output device 22 allows the controlled inventory system to communicate information to the user. The input and output devices 20, 22 may also assume other suitable arrangements. For example, the input device 20 preferably also comprises a magnetic card reader, a bar code scanner, and an input port, such as an RS 232 port.

A plurality of bins 24 are provided within the enclosed space 14 for containing the supply items. Preferably, the bins 24 are standard, commercially available plastic bins. The bins may be varied in size and shape to allow a variety of supply items to be contained within a single dispensing apparatus 10.

Each bin 24 rests on an associated weight sensor 26. Desirably, the bins 24 are secured to the associated weight sensor 26 (FIG. 2), however, the bins 24 may also be configured to loosely rest upon the weight sensor 26. Desirably, each bin 24 is associated with its own individual weight sensor 26. However, if desired, the dispenser 10 may be configured such that multiple bins 24 are supported on a single weight sensor 26. Each of the bins 24 and associated weight sensors 26 are supported by a plurality of shelves 28 which are connected to the cabinet 12. The shelves 28 are also configurable in number and spacing to permit customization of the bin 24.

The weight sensors 26 are configured to send an output signal to the controlled inventory system upon sensing the weight of the items within an associated bin 24. In this manner, the weight sensors 26 communicate a change in weight, and thus a change in quantity, of the supply items within an associated bin 24, as will be described in greater detail below. The weight sensors 26 may comprise any number of suitable sensors, such as strain gages or piezo-electric sensors, for example.

With reference to FIG. 2, each bin 24 desirably includes an indicator 30, such as an LED light. The indicator 30 is electronically connected to the controlled inventory system and is operable to communicate with a user of the dispenser 10. Desirably, each bin 24 includes a dedicated indicator 30. The indicators 30 may be utilized to communicate the location of a desired supply item to a user of the dispenser 10. In addition, multiple indicators 30 may be utilized in a sequenced pattern to lead a user of the dispenser 10 to a desired supply item by progressing from an area of the cabinet 12 down to a single bin 24.

FIG. 3 illustrates an electronic communication, or controlled dispensing, arrangement 32 utilized by the controlled inventory system in operating the dispenser 10 to provide controlled dispensing of supply items. Desirably, the electronic communication arrangement 32 comprises a controller 34 which processes signals provided by various inputs and in response controls the operation of various external devices of the dispenser 10. The controller 34 desirably comprises a memory for storing a programmable protocol and a processor for manipulating the programmable protocol. In addition, the controller 34 advantageously includes a "local" database for storing information. The local database is desirably provided in addition to a "remote" database, as will be described below.

The controller 34 communicates with various user interface components 36 which allow the control inventory system to communicate with a user. Communication between the controller 34 and the user interface components 36 is achieved through an electronic communication network, or bus, 38.

The illustrated user interface components 36 include various input devices, such as a keyboard or a bar code scanner 40, a magnetic card reader 42 and an input port 44. In addition, the user interface components 36 include an output device embodied by a display screen 22. The keyboard or scanner input device 40 allows a user to input information to the controller 34 such as, for example, a user identification number or product identification number. If the input device 40 comprises a bar code scanner, information from a user identification bar code or a product identification bar code may be input to the controller 34. The card reader input device 42 is operable to receive information from a user's identification card and relay that information to the controller 34. The card reader 42 may be configured to read magnetic cards or, alternatively, may be configured to read other types of identification cards, such as those containing information on an embedded computer chip. The input port 44 is desirably an RS 232 port, which allows communication between an external electronic component and the controller 34. The display screen 22 allows the controller 34 to provide information to a user of the dispenser 10. Additionally, the display screen 22 may be a touch screen arrangement and thus also be an input device to the controller 34. Other suitable input or output devices may be used in addition, or in alternative, to those illustrated.

The controller 34 also communicates with various input and output components 48 of the cabinet 12, preferably through a second bus 49. The cabinet components 48 desirably include electronic door lock assemblies 50, electronic door position sensors 52, the weight sensors 26 of FIG. 1, and weight reading compensation components 54, such as calibration buttons, temperature sensors, and environmental sensors, for example.

The electronic door lock assemblies 50, as discussed in relation to FIG. 1, desirably operate to lock the doors 16 in a secured position, wherein access to the enclosed space 14 within the cabinet 12 is prevented. The controller 34 is operable to selectively unlock the electronic door lock assembly 50 and allow the doors 16 to be opened from their secured position.

An electronic door position sensor 52 is preferably associated with each door 16 and is configured to sense whether the door 16 are in an open or secured position. Collectively, the door position sensors 52 communicate with the controller 34 so that the controlled inventory system is informed of the position of each door 16 of the cabinet 12.

The electronic weight sensors 26 provide the controller 34 with a signal that is proportional to the weight of the items in the bin 24, or bins, that are associated with the weight sensor 26. The controlled inventory system utilizes this information to determine the quantity of items, of a known weight, are within an associated bin 24, as will be described below. The signal produced by the sensors 26 can be of any suitable form, including both analog and digital signal types.

The weight signal compensation components 54 are operable to provide information to the controller 34 regarding various external factors which may influence the accuracy of a weight signal generated by the electronic weight sensors 26. These components 54 may be utilized to correct for the inaccurate weight signals produced by the electronic weight sensors 26. As described above, the compensation components 54 preferably comprise calibration buttons, temperature sensors, and environmental sensors (not shown). The calibration buttons may be used to manually compensate for inaccurate weight signals while the temperature and environmental sensors may automatically compensate for inaccurate weight signals.

The controller 34 also periodically communicates with a remote data server 56, which both receives information from, and provides information to, the controller 34. The connection between the controller 34 and the data server 56 is preferably through a modem link 58. The modem may comprise any of a suitable connection such as telephone line, cable line, IR communication, or RF communication, for example. Alternatively, the controller 34 may communicate with the data server 56 over an internet connection 60.

The data collected from the user interfaces 36 is stored locally (in the local database of the controller 34) to allow for intermittent connection with a remote data server 56, preferably for use with an Internet based data management configuration. Advantageously, such an arrangement speeds the transaction time because data does not have to be transmitted to the remote database of the data server 56 during the transaction. The data may be stored in the local database and transmitted at a later time. In addition, the dispenser 10 remains operational even if the connection 58, 60 to the data server 56 is temporarily severed.

The data server 56 and controller 34 desirably include a remote information database and a local information database, respectively. Both databases store information related to users of the controlled inventory system, as well as information concerning the supply items held within the dispenser 10. Such supply item information may include item type, item quantity, item bin location, and item weight. User information stored by the remote and local databases may include identification information, user department information, user access rights, and user and department spending limits. A preferred database model for use with the remote and/or local databases will be described below.

Although FIG. 3 illustrates a single dispenser 10 in communication with the data server 56, preferably more than one dispensing apparatus 10 will be in communication with the data server 56 simultaneously. With such an arrangement, dispensers 10 may be placed throughout an area and the inventory may be managed for all the dispensers 10 by the remotely-located data server 56. Thus, preferably all the information stored within the local database of each individual dispenser 10, including supply item stock levels and all transaction information, may be accessed through the data server 56. Advantageously, this permits aggregation of information from multiple controllers 34 and remote ordering of supply items to return inventory to a desired par level.

FIG. 4 illustrates a preferred primary operational sequence to be utilized by the controller 34 in operating the controlled inventory system. The operational sequence of FIG. 4 may be executed by hardware, software, or a combination thereof, as can readily be determined by one of skill in the art. In addition, FIG. 4 illustrates an exemplary operational sequence and is not intended to limit the scope of the present invention.

When processing a new transaction, the operational sequence desirably begins at start block 62. Moving to step 64, a user of the dispenser 10 is prompted to enter a user identification. Input of the user identification may be achieved through the keyboard or scanner input device 40 or a magnetic card reader input device 42, as well as any suitable alternative user ID input device which may be provided. Such alternative devices may comprise RF ID sensors or biometric identification sensors.

Once a user has entered a suitable means of identification, the process moves to user processing step 66. In step 66, the system determines whether to grant access to supplies within the dispenser 10 based on information stored within the local database of the controller 34 and copied to the remote database of the data server 56. If the user is denied access, the process moves to step 68 where the system indicates to the user that access is denied. Preferably, an access denied message is communicated to the user through the display screen 22.

If the user is approved for access in step 66, the process moves to the account processing step 70. In the account processing step 70, the user or the system selects an account for which the present transaction will be associated. The account selection process will be described below with reference to figures that follow. Once an account has been selected, the process moves to step 72, where one or more doors 16 are unlocked to allow a user access to a portion, or all, of the items within the dispenser 10, in accordance with predetermined access rights. Desirably, predetermined user access rights stored within the local or remote databases are accessed by the controller 34 which, in turn, signals the electronic door locks 50 to unlock the appropriate doors 16. Once the doors have been unlocked, the process moves to the connector block 74.

As an example of predetermined access rights, each user or user's department can have periodic spending limits that act to restrict access to items in the cabinet. When a user reaches an individual (or department) spending limit based on previous transactions, the cabinet denies access to the user. Because the spending limit is reset periodically, the user regains access to the cabinet in the next spending period. In addition, other suitable criteria may also be used to establish access rights in a manner similar to that described above.

From the connector block 74, the process moves to the step 76 where the system determines whether the user knows where the desired item is located within the dispenser 10. This inquiry may be made by a suitable prompt displayed on the display screen 22. If the user knows where the desired item is located, the user may indicate such using an input device 40, such as a keyboard, or the process may simply move to the connector block 78.

If the user does not know the location of the desired item within the dispenser 10, the system moves to step 80 wherein a list of items within the dispenser 10 is displayed on the display screen 22. Once the list of items is displayed on the display screen 22, the process moves to step 82. At step 82, a user can search the displayed list to locate the desired item. Alternatively, the user can scan the bar code of the desired product, if available, and the system will automatically select the desired product from the list.

Once the desired product is selected from the list, the process moves to step 84 where the user is prompted to confirm the selection of the product, desirably by way of a prompt on the display screen 22. Once a selection of product is confirmed, by way of the user actuating an appropriate button on the input keyboard 40, for example, the process moves to step 86 wherein one or more indicators 30 are actuated to direct the user to the location of the desired product. As discussed above, the indicators 30 may flash in a sequence beginning with a region or area of the dispenser 10 and proceeding to the specific bin 24 in which the desired product or item is located. Once the system has indicated the location of the desired product, the process moves from step 86 to the connector block 78.

From connector block 78, the process moves to step 88 where the user either removes or adds an item from a bin 24. Once an item is either taken or removed by the user, the process moves to correction process step 90. At the correction process step 90, the system determines the quantity of items added or removed by an operational sequence, which will be described in detail below. Once the correction process has been completed, the process moves to step 92 where it is determined whether an item was added or removed in process step 88. If an item was returned, the process moves to step 94 wherein the returned items are logged in connection with the present transaction to the local database within the controller 34 for later transmission to remote database of the data server 56. However, at step 92, if it is determined that an item was not returned, and therefore an item was removed at process step 88, the process moves to step 96. At step 96, the items taken from the bin 24 are logged to the database in connection with the present transaction. From either process step 94 or 96, the process moves to connector block 98.

From connector block 98, the process moves to step 100, where the user decides whether it is desired to add or remove more items from the dispenser 10. If the user decides "yes" at step 100, the process moves to step 102 where the user decides whether to change accounts associated with the transaction.

If the user decides "yes" in step 102, the user interfaces with the display 46 or input device 40 to move the process to step 104 wherein the user presses a "select another account" button on the user interface 18. From this point, the process moves to the account processing step 70 so that a new account may be selected by the system. However, if the user decides "no" to the proposition in step 102, the process moves to connector block 74, wherein a new item selection is carried out in accordance to the process described above.

Returning to step 100, if the user decides "no," indicating that no additional items are desired to be taken or returned, the process moves to step 106. At step 106 the system inquires whether the user would like to quit the transaction, preferably by displaying a suitable prompt on the display screen 22. If the user decides "no" to the query of step 106, the process moves to step 102 and continues as described above.

However, if the user decides to quit in step 106, the process moves to step 108 in which a correction process is performed. The correction process of 108 is desirably identical to the correction process of step 90 described above. From step 108, the process moves to process step 109 wherein the user closes the one or more doors 16 that may be open. If desired, the user may be prompted to close the doors by the system displaying a prompt on the display screen 22. Once the door, or doors, 16 are closed, the process moves to step 110 where the user presses an exit key of the keyboard 40, or other appropriate input device, located on the user interface 18. If the user does not press the exit key, the system may automatically end the transaction after a predetermined time out period. From step 110, the process moves to step 64 where a subsequent user is prompted to enter a user ID to begin a new transaction.

FIG. 5 illustrates a preferred operational sequence diagram for an optional self-registration process which allows a new user to become registered with the system automatically. To perform the self-registration function, the system is desirably configured such that a new user must have an electronic identification. The new user may input the electronic identification in response to the prompt by the system at step 64 of FIG. 4. Returning to FIG. 5, from the start block 112, the process moves to step 114 where the system inquires as to whether the identification is valid in accordance with predetermined validation criteria stored within the remote database of the data server 56 and the local database of the controller 34. If it is determined in step 114 that the user identification is not valid, that is not registered with the system, the process moves to step 116.

In step 116, the system decides whether the user can perform a self-registration process. If the system decides the user cannot perform a self-registration process in step 116, the process moves to step 118 wherein an "access denied" or "invalid ID" message is displayed to the user on the display screen 22. However, if the system permits a self registration process in step 116, the process moves to step 120. In step 120, the user is prompted to register a new user name and user information. Once a new user name and information is entered into the system, the process moves to step 122 where admission of the new user is approved and the process returns to the main operational diagram of FIG. 4 at step 70.

If, at process step 114, the system determines that the user identification is valid, that is, the user has already been registered with the system, the process moves to step 124. Step 124 comprises a cost approval process as will be described below. If the user meets the cost approval criteria, the process moves to step 122 where admission to the system is approved. However, if the user does not meet the cost approval criteria of step 124, the process moves to step 118 where an access to the system is denied.

FIG. 6 illustrates an operational flow diagram of the user processing step indicated by step 66 of FIG. 4. From the start block 126, the process moves to step 128 wherein the system loads spending limits stored in the remote data server 56 which are associated with the user and the user's department. Once the spending limits are loaded, the process moves to step 130 where the system inquires as to whether the user is within the user defined spending limits. If the inquiry is answered "no," the process moves to step 132 and admission to the system is rejected. If the user is within defined spending limits, the process moves to step 134 where the system inquires as to whether the user's department is within predetermined department spending limits. If the system answers "no" to this inquiry, the process moves to step 132 and admission to the system is rejected. However, if the user is determined to be within the spending limits of the user's department, the process moves to step 136 and access to the system is permitted.

Figure 7:
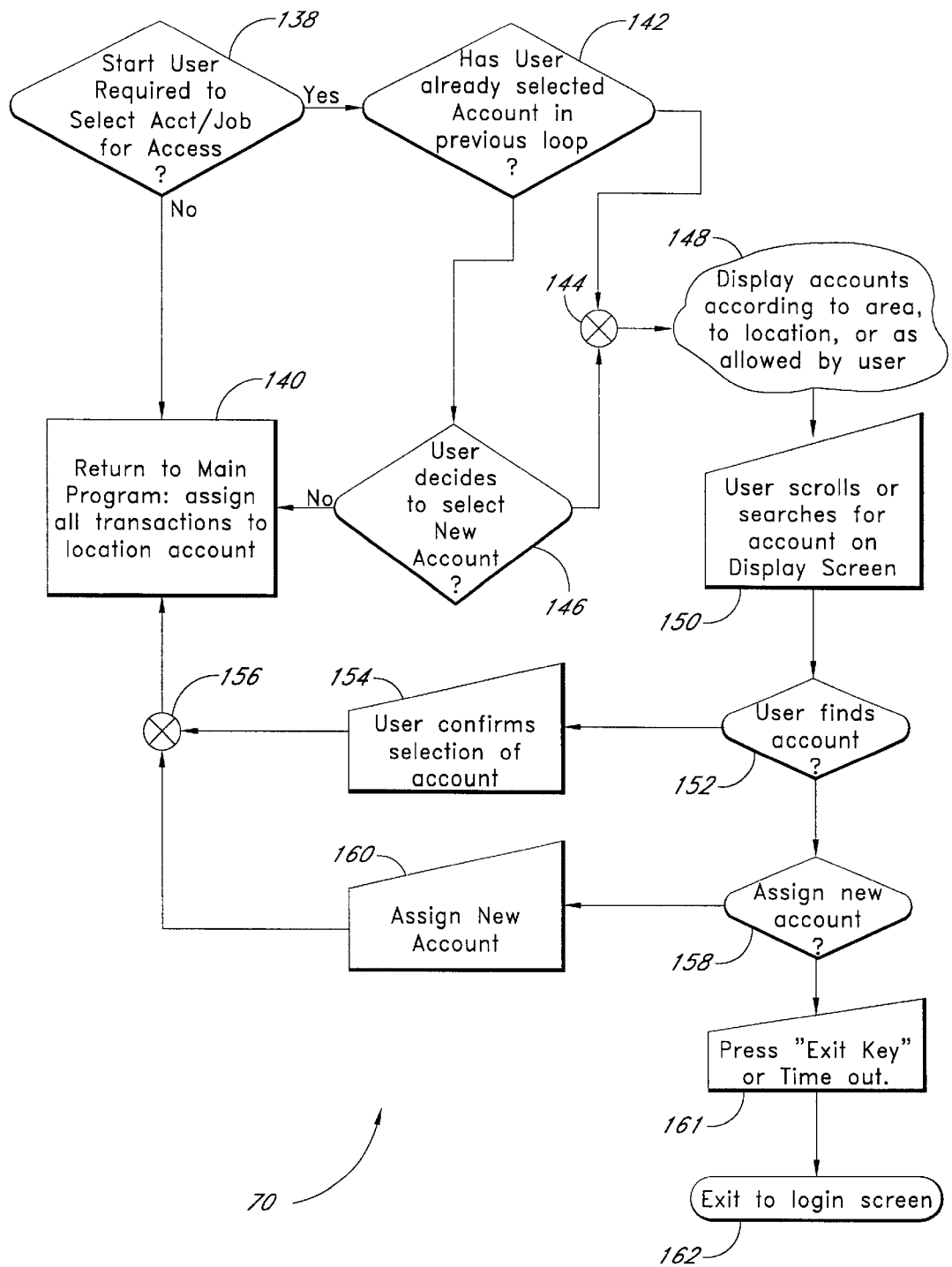
FIG. 7 is an operational flow diagram for an account selection routine for the preferred method of FIG. 4.

FIG. 7 illustrates a preferred operational flow diagram for the account processing step indicated by step 70 of FIG. 4. The account processing process determines an account, or accounts, stored within the local and remote databases to which a particular transaction is associated. Advantageously, a single transaction may be associated with multiple accounts, including a main account and one or more sub-accounts. For example, the main account may relate to the department of the particular user. One sub-account may relate to the particular user and an additional sub-account may relate to the job (or work order) for which the supplies are being utilized. In addition to the examples provided above, other account/sub-account arrangements may also be utilized to provide detailed accounting information regarding the supplies utilized.

The process of FIG. 7 begins at step 138 wherein the system inquires whether the user is required to select an account in order to access the system. If the inquiry of step 138 is answered "no," then the process moves to step 140 wherein the transaction is assigned to the account of the specific dispenser 10 in which the transaction is occurring. However, if the inquiry of step 138 is answered "yes," the process moves to step 142.

In process step 142, the system inquires as to whether the user has already selected an account, such as in response to the flow diagram of FIG. 4. If the inquiry of step 142 is answered "no," the process moves to connector block 144. However, if the answer to the inquiry of step 142 is "yes," the process moves to step 146 wherein the user decides whether it is desirable to select a new account.

If the inquiry of step 146 is answered "yes," the process moves to connector block 144. However, if the user decides "no" in step 146, that is, the user does not desire to select a new account, the process moves to step 140 where the transaction is assigned to the location account of the specific dispenser 10 in which the transaction is occurring.

From connector block 144, the process moves to step 148 wherein accounts are displayed to the user on the display screen 22. The accounts may be displayed according to the location of the dispenser 10 or in accordance with access rights assigned to the user and stored within the database of the data server 56. From step 148, the process moves to step 150 wherein the user scrolls or searches for the desired account displayed on the display screen 22.

From step 150, the process moves to step 152 where the user decides whether the desired account has been located. If the user has found the desired account, the process moves to step 154 wherein the user confirms selection of the desired account. From step 154, once the user has confirmed selection of the desired account, the process moves to connector block 156.

If the inquiry of step 152 is answered in the negative, that is, the user has not found the desired account, the process moves to step 158. Step 158 inquires as to whether the user would like to assign a new account to the transaction. If the user decides "yes" to the inquiry of step 158, the process moves to step 160 and the user enters and assigns a new account to the transaction. From step 160, the process moves to connector block 156 and on to step 140 in accordance with the description provided above. However, if the user answers "no" to the inquiry of step 158, that is, the user does not desire to assign the transaction to a new account, the process moves to step 161 where the user presses an "exit" button on the user interface 18. If the user doesn't press the "exit" button, the system may automatically time out after a predetermined period of time. The process then moves to step 162 wherein the system exits the present transaction returns to a login prompt. Other suitable means of exiting the present transaction, and returning to an appropriate step in the process, may also be utilized.

Figure 8A:
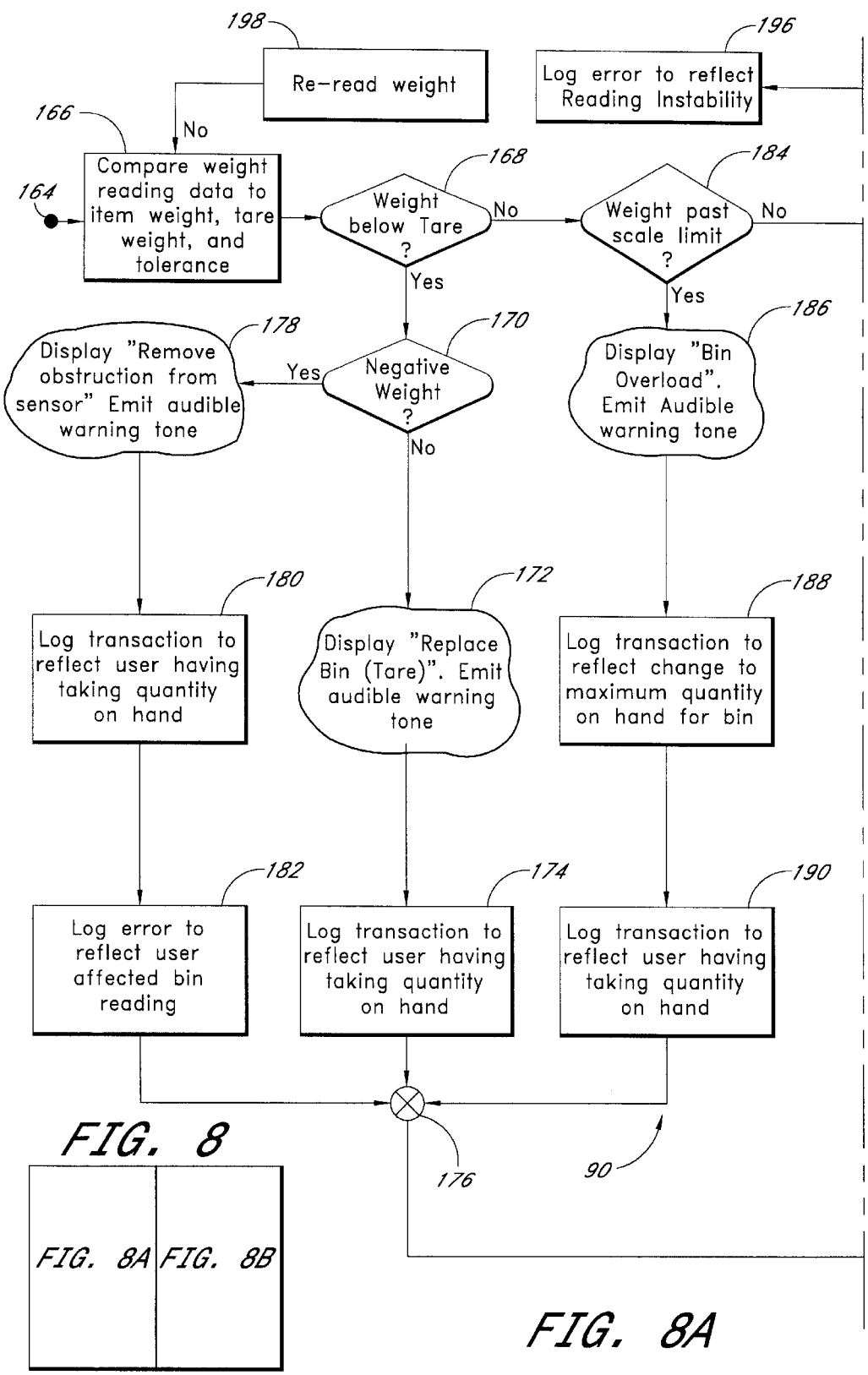
FIG. 8 is an operational flow diagram of a weight reading error routine for the preferred method of FIG. 4.
Figure 8B:
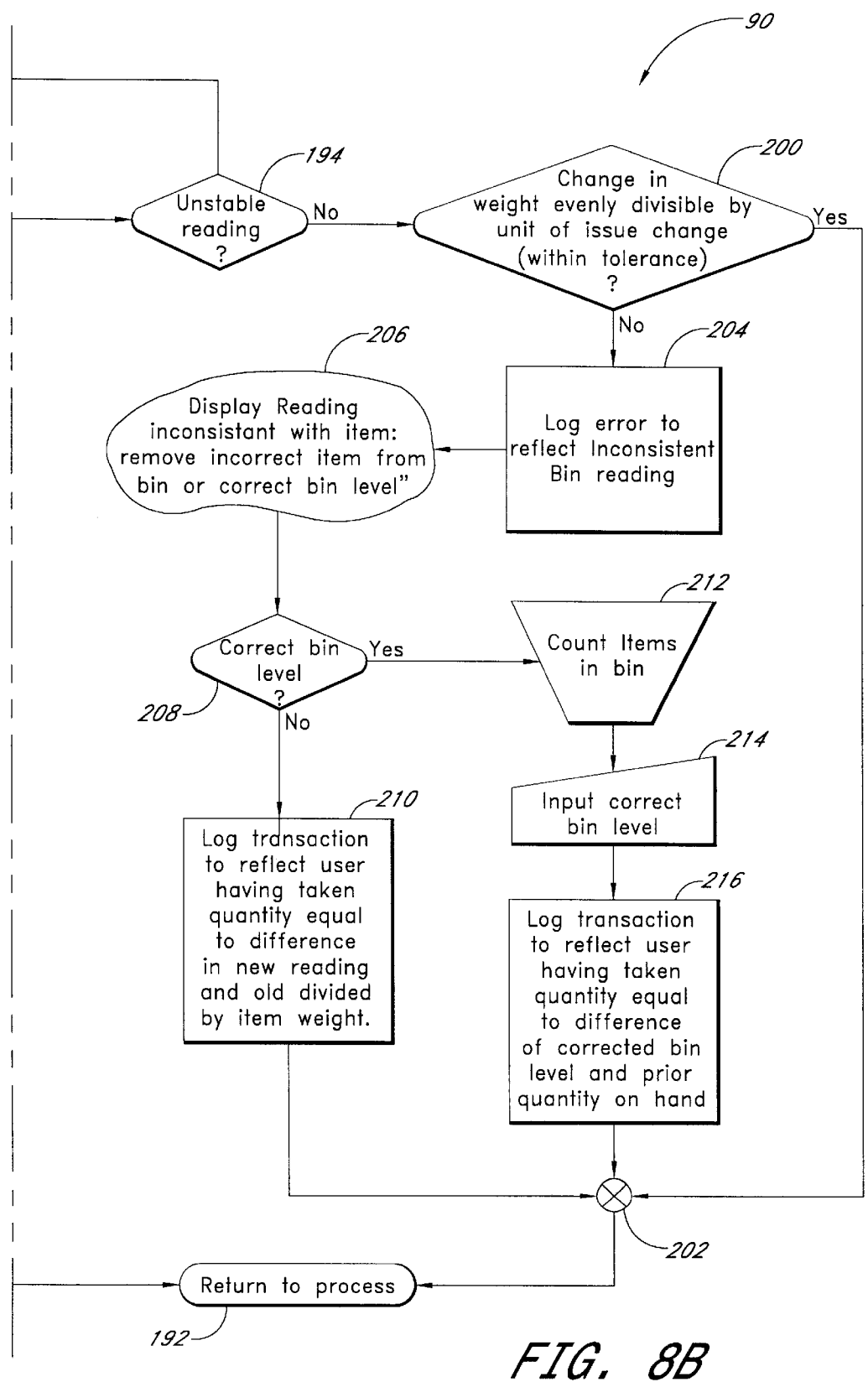

FIG. 8 illustrates a preferred embodiment of an operational flow diagram where the correction process identified by step 90 in FIG. 4. The correction process 90 allows the controlled inventory system to update the remote database of the data server 56 and the local database of the controller 34 when the readings from the weight sensor 26 are incorrect or unstable. The correction process 90 also allows the system to create an error log to allow manual correction and inspection of transactions which resulted in an error.

The operational flow diagram of FIG. 8 begins at start block 164 and moves to step 166 where the system compares a weight reading from the weight sensor 26 to the weight of the item within the associated bin 24, the tare weight of the bin 24 and the tolerance, or acceptable variation in weight among a group of identical items. The process then moves to step 168 where the system inquires as to whether the weight reading is below the tare weight of the bin 24. If the inquiry of step 168 is answered "yes," the process moves to step 170 where the system inquires as to whether the sensed weight is negative. If the answer to the inquiry of step 170 is "no," the system moves to step 172 and a replace bin message is displayed on the display screen 22. Additionally, an audible warning tone may be emitted by the system. From step 172, the system moves to step 174 where the transaction is logged to reflect the user having taken the entire quantity on hand in the associated bin 24 for the present transaction. From step 174, the process moves to connection step 176.

If the inquiry in step 170 is answered "yes," that is, the weight reading from the weight sensor 26 is negative, the process moves to step 178 and a remove obstruction from sensor message is displayed to the user on the display screen 22. Additionally, if so desired, the system may emit an audible warning tone. From step 178, the process moves to step 180 and the transaction is logged to reflect the user having taken the quantity of items on hand in the associated bin 24. The process then moves to step 182 where the error is logged to reflect the user having affected the weight reading. From step 182, the process moves to connector block 176.

Returning to step 168, if the inquiry as to whether the sensed weight is below the tare level of the associated bin 24 is answered "no," the process moves to step 184 where the system inquires as to whether the weight reading is past the scale limit. The scale limit may be stored within the weight sensor 28. If the inquiry of step 184 is answered "yes," the system moves to step 186 and a bin overload message is displayed to the user on the display screen 22. If desired, the system may emit an audible warning tone to the user. From step 186, the process moves to step 188 and the transaction is logged to reflect a change to the maximum quantity of items on hand for the bin 24. The process then moves to step 190 and the error is logged to reflect that the user overloaded the bin 24. The process moves from step 190 to connector block 176. From connector block 176, the process moves to step 192 where the correction process returns to the main operational process of FIG. 4.

Returning to step 184, if the inquiry as to whether the weight is past the limit of the weight sensor 26 is answered "no," the process moves to step 194 where the system inquires as to whether the weight reading from the weight sensor 26 is unstable. If the inquiry of step 194 is answered "yes," the process moves to step 196 and the error is logged to reflect a reading instability from the weight sensor 26. From step 196, the process moves to step 198 and a new reading from the weight sensor 26 is taken. The process then moves to step 166 and follows the process as described above.

If the inquiry of step 194 is answered "no," the process moves to step 200 where the system inquires as to whether the change in weight of items in the bin 24 is divisible by a multiple of the individual item weight within the bin 24, within a predetermined tolerance. If the answer to the inquiry in step 200 is "yes," the system moves to connector block 202.

If the answer to the inquiry in step 200 is negative, the system moves to step 204 and logs the error to reflect an inconsistent weight reading from the bin 24. From step 204, the system moves to step 206 where a reading "inconsistent with item, remove incorrect item from bin or correct bin level" message is displayed to the user on the display screen 22. From step 206, the process moves to step 208.

At step 208, the process inquires as to whether the user would like to perform a manual correct bin level operation. If the inquiry of step 208 is answered "no," the process moves to step 210 where the transaction is logged to reflect the user having taken a quantity of items equal to the difference in the quantity of items determined by the new weight reading from the weight sensor 26 and the quantity of items determined by the old weight reading from the weight sensor 26, divided by the weight of an individual item in the associated bin 24. From step 210, the process moves to connector block 202.

Returning to step 208, if the user desires to perform a correct bin level manual operation, the process moves to step 212 where the user is prompted to manually count the items present in the associated bin 24. The process then moves to step 214 where the user is prompted to input the correct quantity of items on hand in the associated bin 24. Once the user has input the correct quantity of items in the bin 24, the process moves to step 216 and the transaction is logged to reflect the user having taken a quantity of items in the associated bin 24 equal to the difference between the corrected level and the prior quantity of items on hand. From step 216, the process moves to connector block 202. From connector block 202, the process moves to step 192 where the process returns to the operational flow of FIG. 4, as described above.

Figure 9A:
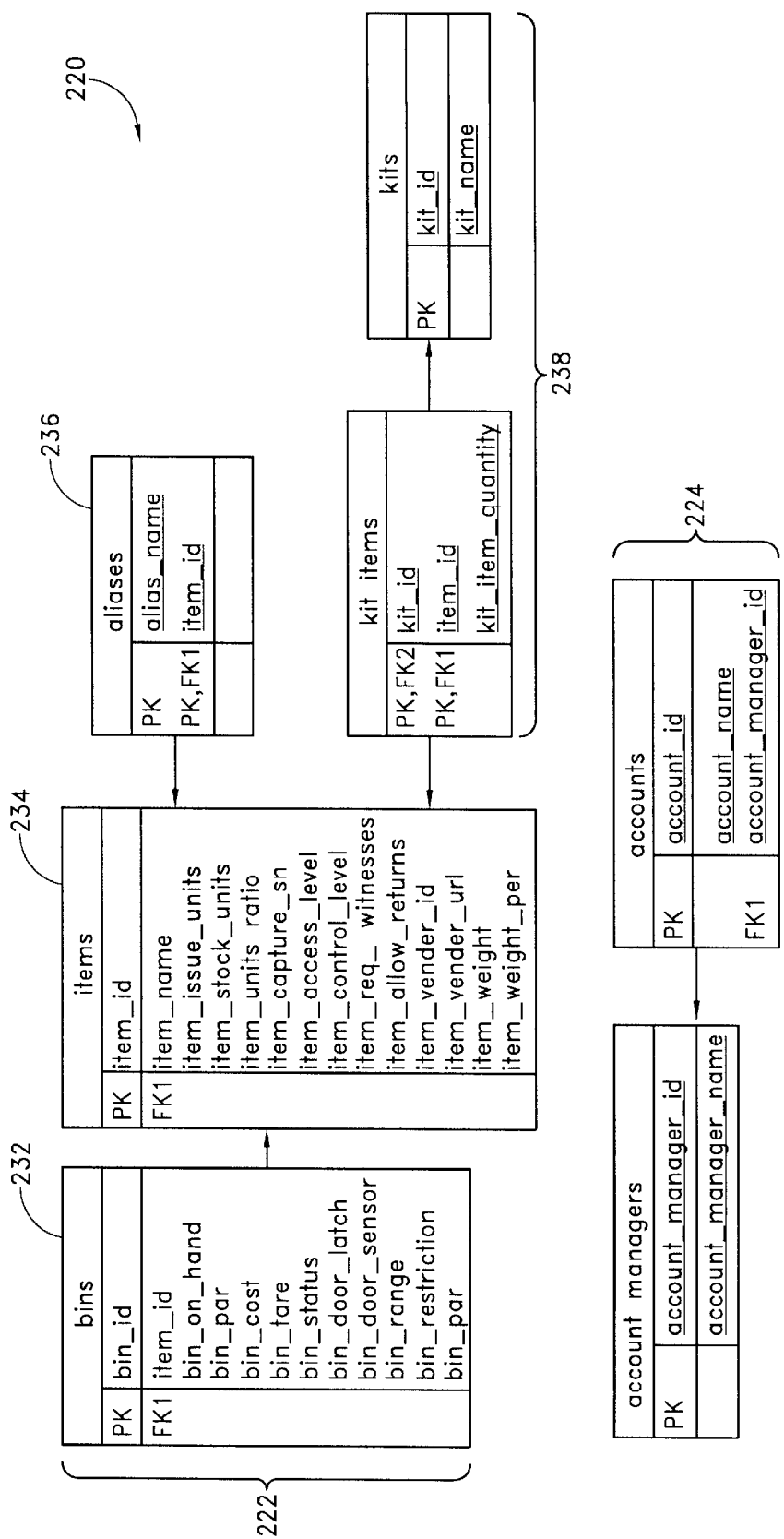
FIG. 9 is a step diagram illustrating a preferred database model for use with the preferred method of FIG. 4.
Figure 9B:
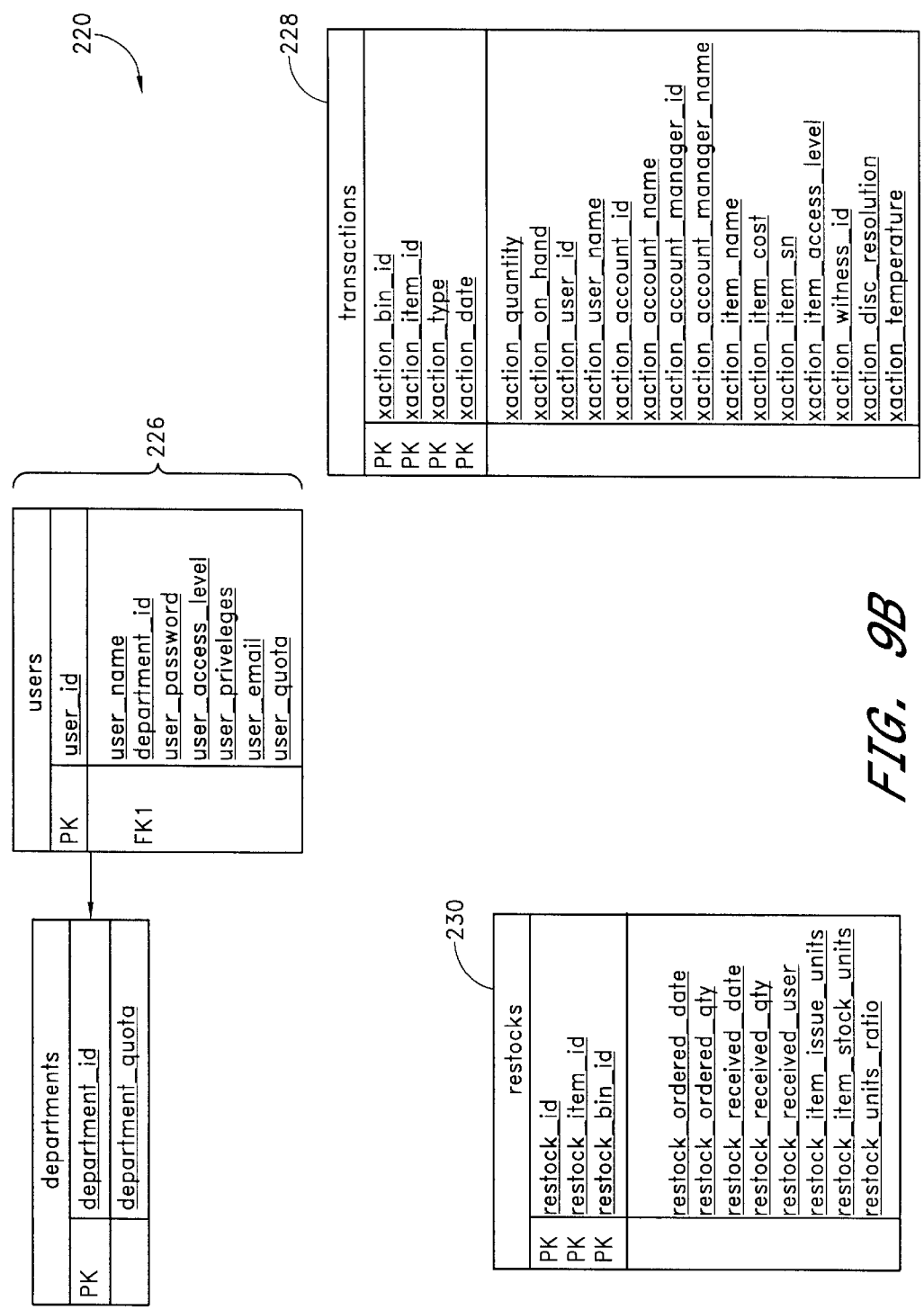

FIG. 9 illustrates a preferred database model 220 for use with the controlled inventory system, preferably in the local database of the controller 34. The information within the database model 220 is utilized by the controlled inventory system to perform transactions, such as determining the quantity of supply items that are present within the dispenser 10 or determining user access rights for a particular transaction. The preferred database model 220 also collects a variety of information regarding individual transactions. Because this database is copied to the remote database of the data server 56, this information may be sorted by any desired characteristic and printed in a report format by the data server 56.

The illustrated database model 220 segregates stored information into several portions, including dispenser related information 222, account related information 224, user related information 226, transaction related information 228 and restocking related information 230. The database model 220 of FIG. 9 illustrates one of the many possible database structures that may be utilized in connection with the present controlled inventory system. As such, the database model 220 is intended to illustrate, and not to limit, the present invention.

The dispenser related information 222 portion of the database 220 is further divided into bin information 232, item information 234, alias information 236 and kit information 238. The bin information 232 may include specific information about the bins 24 within a particular dispenser 10. Each bin 24 is desirably given an identification number which is stored in the database 220, along with bin information preferably including the item within the bin and information concerning the desirable maximum and minimum quantity of items to be held by the bin 24. In addition, dispenser related information 222 may include information concerning the bin 24 location within the dispenser 10.

Preferably, the item information 234 includes an item identification and item name. The item information 234 may also include additional item-specific information for use in determining quantity from the signal generated by the weight sensors 26, as well as reordering information, such as item cost and vendor. The alias information 236 may include a common name, or alias, for an item along with its item identification. This information may facilitate location of the item within the dispenser 10 by referring to the common name of the item, rather than its technical name.

Finally, a preferred dispenser related information 222 portion of the database 220 includes kit information 238. A "kit" may include two or more individual supply items which are commonly used together for a specific function. The system may be configured to allow a user to select a desired kit and the kit information 238 in the database would allow the system to determine the individual supply items that make up the kit.

The account related information 224 portion of the database 220, as illustrated, may include information regarding account identification, account name and information related to a manager of the account for each account in the database 220. The accounts may be configured by a user of the system so that each transaction may be assigned to a single account.

Preferably, user related information 226 includes information about users of the system as well as information about the user's department. The database 220 may include security information about each user of the system, such as a system access password, for example. In addition, information to regarding the user's access rights may be stored within the database 220. The database 220 desirably also includes information about each department, such as a department identification, department name, and information concerning the department's access rights to the controlled inventory system.

The transaction related information 228 portion of the database 220 desirably records information for each transaction that occurs in any dispenser 10 connected to the system. For example, this information may include any, or all, of the dispenser related information 222, account related information 224, or user related information 226 described above, in addition to other desired information.

The restocking related information 230 portion of the database desirably includes information concerning restocking of the supply items into the dispenser(s) 10 of the controlled inventory system. As illustrated, this information may concern the particular item(s) or the particular dispenser(s) affected by the restocking of supply items. The restocking related information 230 portion of the database may also include information regarding the order which was placed with a vendor, or vendors, to facilitate the restocking. The inclusion of both types of information permits comparison of the restocking order with the items actually received.

Optionally, the dispenser 10 and controlled dispensing system may be adapted for use with perishable supply items, that is, items having an expiration date. In some instances, the dispenser 10 may be refrigerated to preserve the items at least until their expiration date. Additionally, both the local and remote databases may include additional information for use by the system when perishable supplies are present in the dispenser 10. For example, the bin or item information 232, 234 may include additional information about the perishable supply item held within an associated bin 24, such as the expiration date of the perishable item. Additionally, the transaction information 228 portion of the database 220 may include additional information, such as transaction temperature for example, as illustrated in FIG. 9.

Although the present invention has been described in the context of a preferred embodiment, it is not intended to limit the invention to the provided example. Modifications to the physical dispensing unit, hardware and software, or disclosed operational sequences that are apparent to one of skill in the art are considered to be part of the present invention. Accordingly, the invention should be defined solely by the appending claims in light of the teachings of the disclosure.

What is claimed is:

1. An office supply dispensing apparatus, comprising:
    a cabinet defining an enclosed space and having at least one door, said at least one door having a secured position wherein access to said enclosed space is prevented;
    at least one surface within said enclosed space, said at least one surface being configured to receive a quantity of an office supply item:
    a controlled inventory arrangement comprising a memory for storing a programmable protocol, a processor for processing said programmable protocol, a user interface electrically connected to said processor, said user interface configured to receive a user identification input, a weight sensor electrically connected to said processor, wherein said weight sensor is operatively associated with said at least one surface to determine the weight of said Quantity of said office supply item;
    wherein said controlled inventory arrangement is configured to release said at least one door from said secured position in response to processing of said programmable protocol upon receiving an approved user identification input;
    wherein said controlled inventory arrangement is additionally configured to determine a change in said Quantity of an office supply item in response to processing of said programmable protocol upon determining a change in weight of said Quantity of said office supply item; and
    wherein said controlled inventory arrangement additionally comprises a calibration input device electrically connected to said processor, said processor operating to modify said programmable protocol in response to calibration data received from said calibration input device.

2. A method of controlled dispensing of office supplies, comprising:
    providing a secured selection of office supply items, each of said office supply items having a known weight;
    authenticating the identification of a user of said office supply items;
    asking said user to select a transaction account;
    allowing said user to access a portion of said selection of said office supply items according to predetermined user access rights;
    determining a quantity of said office supply items added or removed by said user by determining a change in weight of said office supply items;
    recording said addition or removal of said supply items to said transaction account; and
    further comprising assigning said user to a department, wherein said portion of said selection of said office supply items able to be accessed by said user is determined by a predetermined department spending limit.

3. A method of controlled dispensing of office supplies, comprising:
    providing a secured selection of office supply items, each of said office supply items having a known weight;
    authenticating the identification of a user of said office supply items;
    asking said user to select a transaction account;
    allowing said user to access a portion of said selection of said office supply items according to predetermined user access rights;
    determining a quantity of said office supply items added or removed by said user by determining a change in weight of said office supply items: recording said addition or removal of said supply items to said transaction account;
    wherein said authentication of user identification is achieved by reading electronic user identification, said method additionally comprising determining if said user is a new user and registering a name of said new user; and wherein said electronic user identification includes an identification of a department associated with said new user, said method additionally comprising assigning said new user to said associated department.

4. A method of controlled dispensing of consumable supplies, comprising:

providing a secured selection of consumable supply items, each of said items having a known weight;

providing a plurality of bins for storing said items, each bin having an associated weight sensor for determining the weight of said items within said bin;

authenticating the identification of a user of said items;

requesting said user to select a transaction account;

allowing said user to access a portion of said bins according to predetermined user access rights;

determining a quantity of said items added or removed from one of said plurality of bins by said user by determining a change in a weight of said bin; recording said addition or removal of said items to said transaction account; and wherein said user is prompted to correct the quantity of said items within said bin in response to an inconsistent weight reading from said weight sensor, said method additionally comprising asking user to count said items in said bin.

5. The method of claim 4, additionally comprising creating a transaction log for each type of said item taken from said bin, said method additionally comprising logging said transaction to reflect said user taking a quantity of said items equal to difference of said items counted by said user and quantity of said items in said bin prior to said transaction.

6. A method of controlled dispensing of consumable supplies, comprising:

providing a secured selection of consumable supply items, each of said items having a known weight;

providing a plurality of bins for storing said items, each bin having an associated weight sensor for determining the weight of said items within said bin;

authenticating the identification of a user of said items;

requesting said user to select a transaction account;

allowing said user to access a portion of said bins according to predetermined user access rights;

determining a quantity of said items added or removed from one of said plurality of bins by said user by determining a change in a weight of said bin;

recording said addition or removal of said items to said transaction account; and additionally comprising creating a transaction log for each type of said item taken from said bin, said method additionally comprising logging said transaction to reflect said user taking entire quantity of said items from said bin in response to a weight reading from said weight sensor being below a tare weight of said bin.

7. The method of claim 6, additionally comprising creating an error log for each error associated with said transaction, said method additionally comprising logging said error to reflect said user affected a weight reading from said weight sensor.

8. A method of controlled dispensing of consumable supplies, comprising:

providing a secured selection of consumable supply items, each of said items having a known weight;

providing a plurality of bins for storing said items, each bin having an associated weight sensor for determining the weight of said items within said bin;

authenticating the identification of a user of said items;

requesting said user to select a transaction account;

allowing said user to access a portion of said bins according to predetermined user access rights;

determining a quantity of said items added or removed from one of said plurality of bins by said user by determining a change in a weight of said bin;

recording said addition or removal of said items to said transaction account; and additionally comprising creating a transaction log for each type of said item added to said bin, said method additionally comprising logging said transaction to reflect said user adding maximum quantity of said items for said bin in response to a weight reading from said weight sensor being above a maximum limit of said weight sensor.

9. The method of claim 8, additionally comprising creating an error log for each error associated with said transaction, said method additionally comprising logging said error to reflect said user overloaded said bin.

10. A method of controlled dispensing of consumable supplies, comprising:

providing a secured selection of consumable supply items, each of said items having a known weight;

providing a plurality of bins for storing said items, each bin having an associated weight sensor for determining the weight of said items within said bin;

authenticating the identification of a user of said items;

requesting said user to select a transaction account;

allowing said user to access a portion of said bins according to predetermined user access rights;

determining a quantity of said items added or removed from one of said plurality of bins by said user by determining a change in a weight of said bin;

recording said addition or removal of said items to said transaction account; and wherein at least a portion of said consumable items have an expiration date, the method additionally comprising determining a transaction date and allowing access to said portion of said consumable items having an expiration date if the transaction date is on or before the expiration date.

* * * * *